May 9, 1950      J. H. BOOTH      2,507,087
BALL JOINT
Filed Sept. 13, 1946
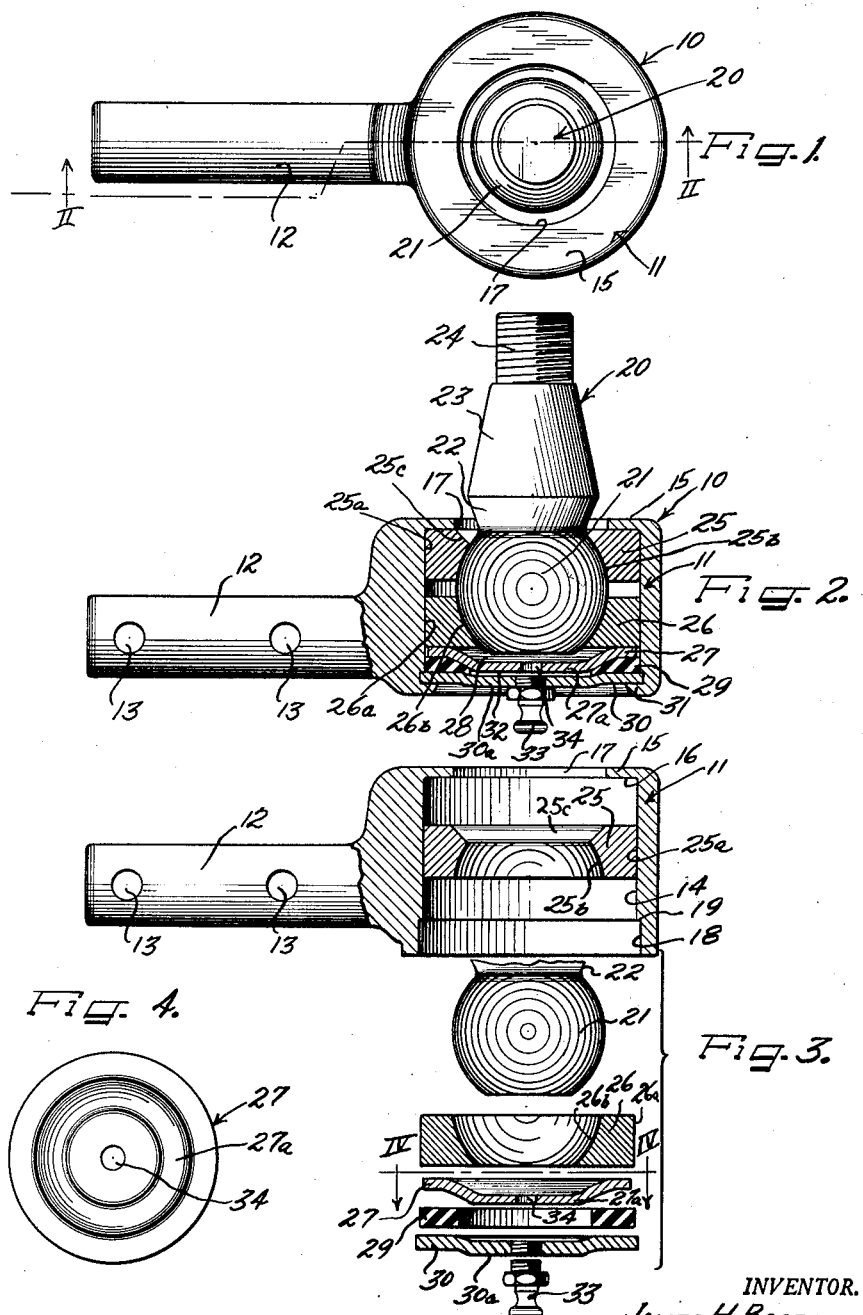
INVENTOR.
JAMES H. BOOTH
BY
The firm of Charles H. Hill
Attys.

Patented May 9, 1950

2,507,087

UNITED STATES PATENT OFFICE 2,507,087

BALL JOINT

James H. Booth, Detroit, Mich., assignor to Thompson Products, Inc., Cleveland, Ohio, a corporation of Ohio Application September 13, 1946, Serial No. 696,823

4 Claims. (Cl. 287—90)

This invention relates to a joint assembly having automatic wear take-up action without the heretofore-necessary springs.

Specifically, the invention deals with a ball and socket type joint wherein a ball ended stud has the ball end thereof tiltable and rotatable in a pair of opposed rings, and wherein one of the rings is urged toward the other ring to maintain proper bearing contact between the rings and ball end without utilizing a spring for motivating the rings.

According to this invention, a socket member or housing has a cylindrical chamber with an apertured end wall at one end thereof and a counterbore in the other end thereof. A first metal ring member is pressed into the chamber against the apertured end wall. A ball stud has the shank portion thereof extending freely through the ring and apertured end wall. The ball end of the stud is partially seated in the ring. A second metal ring is slidable in the chamber and receives a portion of the ball end therein. The two rings are in spaced opposed relation. An inner plug or retainer is bottomed on the slidable ring and has a dished or depressed portion providing a well spaced from the ring and adapted to receive the free end of the ball therein. This inner plug or retainer is centrally apertured. A resilient washer, preferably composed of lubricant-resisting synthetic rubber or the like, is mounted in the chamber against the retainer. An outer plug or closure wall is seated in the counterbore and is spun into the housing. This outer plug carries a lubricant fitting which supplies lubricant through the hole in the retainer into the well or space provided thereby. This lubricant is then fed to the engaging surfaces of the ball end and ring. The housing preferably has a laterally extending stem or shank for attachment to a bracket such as, for example, the upper or lower arm of the front suspension for an automobile wheel.

A feature of the invention resides in the utilization of a resilient washer to supply the motivating force for maintaining relatively movable joint parts in proper bearing engagement even as the parts wear.

A further feature of the invention is the provision of a springless ball and socket type joint wherein a loaded rubber-like washer between two plug members serves to maintain the joint parts in proper bearing relation without interfering with lubrication of the parts.

It is, then, an object of this invention to provide a joint construction having automatic wear take-up properties motivated by a loaded rubber-like member.

Another object of the invention is to provide a springless ball and socket type joint wherein proper bearing relationship between the relatively movable parts thereof is maintained by means of a loaded resilient washer.

A still further object of the invention is to provide a ball and socket type joint wherein the ball end of a stud is tiltable and rotatable on the interior bearing walls of opposed metal rings carried by a housing, and wherein one of the rings is urged toward the other by means of a rubber washer that is deformably loaded between two plug members, one of which is fixed to the housing, and the other of which is movable in the housing.

A still further object of the invention is to provide a ball and socket type wheel suspension joint or the like wherein bearing members for the ball are urged together through the media of a loaded rubber washer having a relatively high form factor.

Other and further objects of the invention will be apparent to those skilled in the art from the following detailed description of the annexed sheet of drawings which, by way of a preferred example, illustrates one embodiment of the invention.

On the drawings:

Figure 1 is a top plan view of a ball and socket joint according to this invention.

Figure 2 is a longitudinal cross-sectional view, with parts in side elevation, taken along the line II—II of Figure 1.

Figure 3 is a view similar to Figure 2 but illustrating the parts in spaced or exploded relationship to show the manner in which the same are assembled.

Figure 4 is a plan view of the retainer or inner plug taken along the line IV—IV of Figure 3.

As shown on the drawings:

The joint assembly 10 of this invention is composed of a housing 11 of generally cylindrical contour with a laterally extending rod-like stem or shank 12 having bolt-receiving holes 13, 13 therethrough. The shank or stem 12 is adapted for insertion into a tubular bracket such as is carried on the upper or lower wheel suspension arm of a front wheel suspension for an automobile. The cylindrical housing 11 has a cylindrical bore 14 therethrough with an end wall 15 at one end thereof providing a shoulder or end flange 16 at one end of the bore. The end wall 15 has an aperture 17 therethrough of smaller diameter than the bore 14.

The other end of the bore 14 has a counterbore 18 therein extending to a shoulder 19.

An open-ended cylindrical chamber is thus provided with a first shoulder 16 at one end and a second shoulder 19 at the other end.

A ball stud 20 has a ball end 21 disposed in the cylindrical chamber of the housing. This ball end has a shank extending therefrom through the aperture 17 of the housing. The shank of the stud 20 includes a reduced-diameter tapered neck portion 22 diverging to the large end of a reversely tapered mounting portion 23 which converges to a threaded cylindrical end portion 24. The tapered portion 23 is adapted to be inserted in the eye of a wheel bracket or the like (not shown). A nut (not shown) threaded on the portion 24 will hold the tapered portion 23 in locked position in its eye receptacle. The reduced neck portion 22 is substantially aligned in the aperture 17 of the end wall 15 to afford additional space for increased tilting of the stud.

A first metal bearing ring 25 is press-fitted into the bore 14 against the shoulder 16. This ring 25 has an external cylindrical wall 25a sized for press-fit engagement in the cylindrical bore 14 together with a fragmental spherical internal wall 25b for receiving the upper portion of the ball end 21. The internal wall 25b converges from a diameter somewhat smaller than the great diameter of the ball end 21 so that the ring will lie only on the upper portion of the ball. The convergent end of the inner wall 25b extends to an outwardly flaring or beveled wall 25c diverging to the end wall 15 of the housing. This beveled wall 25c affords space for the neck 22 of the stud shank when the stud is tilted.

A second metal ring 26 is slidably mounted in the bore 14 of the housing. This ring 26 has an external cylindrical wall 26a sized for sliding fit on the wall of the bore 14. A segmental spherical internal wall 26b is provided in the ring 26 for receiving the lower portion of the ball end 21. This wall 26b converges from a top face to a bottom face of the ring and the great diameter of the wall is somewhat smaller than the great or major diameter of the ball end 21 so that the ring 26 will be spaced from the major diameter of the ball and will be in spaced relation from the ring 25 at all times.

The rings 25 and 26 are sufficiently thick so that their outer walls 25a and 26a will have good bearing engagement with the wall of the bore 14 to prevent any tilting or cocking of the rings in the housing.

An inner plug or retainer 27 is fitted freely in the bore 14 of the housing and is bottomed against the ring 26. This retainer 27 has a depressed or dished central portion 27a that is spaced from the ring 26 when the periphery thereof is bottomed on the ring to define a well or localized chamber 28 in the housing adjacent the free end of the ball and adapted to receive the ball end therein as shown in Figure 2.

A rubber washer 29 is next inserted into the cylindrical chamber of the housing and is bottomed on the peripheral portion of the retainer 27 around the dished central portion thereof. This washer 29, as shown in Figure 3, in its free state has a substantially rectangular cross section with a circular outer diameter sized for fitting in the bore 14 and with a circular inner diameter sized for fitting around the central dished portion 27a of the retainer.

A second or outer plug 30 is provided for closing the counterbored end of the housing. This plug 30 fits in the counterbore 18 and is bottomed against the shoulder 19. The housing is then spun under the peripheral portion of the plug as at 31 to lock the plug in the counterbore against the shoulder 19. The plug 30 preferably also has a slightly depressed central portion 30a to maintain a clearance or gap 32 between the central portion 27a of the plug 27 and the central portion 30a of the plug 30.

A lubricant fitting 33 is threaded into the central depressed portion 30a of the closure plug 30 for supplying lubricant to the gap or space 32 in the housing and thence through a central aperture 34 in the central portion of the depressed part 27a of the retainer 27 into the well 28. The ball 21 extends into this well 28 and its surface will be lubricated as the ball is tilted. Lubricant will be fed between the ball surface and the internal wall 26b of the ring 26 through the gap between the rings and into the space between the ball and the internal wall 25b of the bearing 25. In this arrangement, therefore, the bearing surfaces between the ball end of the stud and the rings will be readily fed with lubricant.

As shown in Figure 3, the parts of the joint are assembled by first pressing the ring 25 into the bore 14. The shank of the stud is then passed through the ring 25 and aperture 17 of the housing to seat the ball end 21 of the stud on the ring 25. The ring 26 is next dropped into the housing where it will slide along the bore walls 14 to seat itself on the ball end 21. The retainer 27 is then dropped into position on the bearing 26, the washer 29 is inserted on the retainer 27, the closure plug is seated in the counterbore 18, and the housing is spun or locally deformed as by crimping or the like to lock the closure plate against the shoulder 19. The washer will be loaded between the plugs 27 and 30 to be deformed from the position shown in Figure 3 to the position shown in Figure 2. In this deformed condition, the washer exerts an expanding force through the retainer 27 against the slidable bearing 26 to hold the bearing in good bearing relationship with the ball end 21. As wear develops on the bearing wall 26b or on the ball 21, the bearing 26 will be moved further toward the major diameter of the ball end, thereby taking up any clearance. Similarly, if wear develops on the bearing wall 25b of the ring 25, the ball itself will be urged by the ring 26 further into the ring 25 to take up any clearance.

The ball stud 20 can tilt and rotate on the rings 25 and 26. The assembly is easily put together as illustrated in Figure 3. No springs are necessary to provide for an automatic wear take-up. The loaded washer 29, by being surrounded with plugs and housing walls on all sides except at its inner periphery, can only deform into the space 32 and thereby has a relatively high form factor. It can yield only through further deformation into the space 32. The assembly is thereby adapted to carry heavy loads without separation of the ball and socket elements. The rubber or resilient material of the washer 29 is thoroughly protected against any galling or scuffing action since the members which surround it are not moved relative thereto during operation of the joint.

It will, of course, be understood that various details of construction may be varied through a wide range without departing from the principles

I claim as my invention:

1. A ball and socket joint comprising a housing having a chamber with an apertured end wall at one end thereof providing a first shoulder and a counterbore in the other end thereof providing a second shoulder, a stud having a shank extending freely through the apertured end wall and a ball end in said chamber, a first bearing ring in said chamber around said ball end and bottomed on the first shoulder, a second bearing ring in said chamber around said ball end in spaced relation from the first ring, said bearing rings having fragmental spherical interior bearing walls receiving said ball end of the stud together with chamber-wall engaging exterior walls of appreciable thickness to resist cocking of the rings in the chamber, a retainer member in said chamber bottomed on said second ring and having a depressed central portion providing a localized well in the chamber adjacent the ring and in communication with the ball end of the stud, said depressed portion of the retainer having an aperture therethrough, a closure plug anchored in the counterbore of the housing against said second shoulder, a resilient washer between said retainer and said closure plug deformed by the closure plug into loaded condition to urge the retainer against the second ring, the second ring against the ball end of the stud, and the ball end of the stud against the first ring, and a lubricant fitting on said closure plug for feeding lubricant through the washer and aperture of the retainer into said well for lubricating the ball end of the stud.

2. A ball and socket joint comprising a housing having a chamber with an apertured end wall, a stud having a shank extending freely through the apertured end wall and having a ball end in said chamber, first and second opposed bearing members in said chamber having segmental spherical interior bearing walls receiving the ball end of said stud, said first bearing member having a central aperture for receiving the stud therethrough, a closure plug anchored in the end of said housing opposite to said apertured wall, a retainer in said housing bottomed on said second bearing member, said retainer having a centrally depressed portion, a rubber washer between said retainer and said closure plug and surrounding the centrally depressed portion of the retainer, and said washer being deformed between the retainer and the closure plug into loaded condition to urge said retainer against said second bearing member.

3. In a ball and socket joint including a housing defining a central chamber, a pair of opposed bearing rings in said chamber, and a ball stud having a ball head tiltably mounted in said rings, the improvement of a resiliently loaded retainer member having a depressed central portion providing a localized well adjacent one of said rings for receiving the ball end of the stud.

4. In a ball and socket joint including a housing defining a chamber, a pair of opposed rings in said chamber and a ball stud tiltably mounted in said rings, the improvement of a retainer member in the housing having a depressed central portion providing a localized well adjacent one of the rings, and a resilient member disposed between one wall of the housing and said retainer for resiliently loading the retainer to press the bearing members into bearing engagement.

JAMES H. BOOTH.

REFERENCES CITED

The following references are of record in the file of this patent:

UNITED STATES PATENTS

| Number | Name | Date |
| --- | --- | --- |
| 1,859,777 | Keys et al. | May 24, 1932 |
| 1,934,223 | Booth | Nov. 7, 1933 |
| 2,037,786 | Hufferd | Apr. 21, 1936 |
| 2,083,718 | Kull et al. | June 15, 1937 |
| 2,383,378 | Flumerfelt | Aug. 21, 1945 |